(12) United States Patent
Kondo

(10) Patent No.: US 7,150,447 B2
(45) Date of Patent: Dec. 19, 2006

(54) ELECTROMAGNETIC DRIVING APPARATUS AND ELECTROMAGNETIC VALVE

(75) Inventor: Jiro Kondo, Kariya (JP)

(73) Assignee: Denso Corporation (JP)

( * ) Notice: Subject to any disclaimer, the term of this patent is extended or adjusted under 35 U.S.C. 154(b) by 113 days.

(21) Appl. No.: 10/986,072

(22) Filed: Nov. 12, 2004

(65) Prior Publication Data
US 2005/0145811 A1 Jul. 7, 2005

(30) Foreign Application Priority Data
Nov. 12, 2003 (JP) ............... 2003-382558

(51) Int. Cl.
*F16K 31/06* (2006.01)
(52) U.S. Cl. ............... 251/129.18; 251/129.15
(58) Field of Classification Search ............ 251/129.18
See application file for complete search history.

(56) References Cited

U.S. PATENT DOCUMENTS

2002/0139951 A1* 10/2002 Kawamura et al. .... 251/129.15
2003/0116739 A1* 6/2003 Murao et al. .......... 251/129.15
2004/0142443 A1* 7/2004 Mahajan ................ 435/200

FOREIGN PATENT DOCUMENTS

JP 2001-187979 7/2001

* cited by examiner

*Primary Examiner*—J. Casimer Jacyna
(74) *Attorney, Agent, or Firm*—Nixon & Vanderhye PC

(57) ABSTRACT

A bottomed cylindrical member is disposed inner side of a stator core and a coil. The cylindrical member is made of non-magnetic material such as a stainless steel. The cylindrical member has a small diameter portion at the bottom side and a large diameter portion continuously made with the small diameter portion at the side of an attracting portion and has a larger inner diameter than that of the small diameter portion. The small diameter portion is slidablly in contact with a slider core, and reciprocatably supports the slider core. Since a radius difference between the small diameter portion and the large diameter portion is equal to or larger than 30 μm, a clearance larger than sliding clearance is formed between an inner circumferential surface of the large diameter portion and an outer circumferential surface of the sliding core. Thus, an electromagnetic driving apparatus and an electromagnetic valve, which smoothly reciprocate the sliding core, are provided.

9 Claims, 2 Drawing Sheets

ELECTROMAGNETIC DRIVING APPARATUS AND ELECTROMAGNETIC VALVE

CROSS-REFERENCE TO RELATED APPLICATION

This application is based on Japanese Patent Application No.2003-382558 filed on Nov. 12, 2003, the disclosure of which is incorporated herein by reference.

FIELD OF THE INVENTION

The present invention relates to an electromagnetic driving apparatus and an electromagnetic valve, each of which has a slider slidablly supported in a cylindrical member.

BACKGROUND OF THE INVENTION

JP-2001-187979A shows an electromagnetic valve which has a slider slidablly supported in a cylindrical member made of non-magnetic material, the cylindrical member covering an outer surface of the slider. In this valve, the cylindrical member is disposed at an interior of a stator. According to such a configuration, a deviation of axes between the stator and the slider is prevented, so that an outer diameter of the electromagnetic driving apparatus with the electromagnetic valve is reduced as much as possible.

However, in such the electromagnetic driving apparatus, when foreign particles are stuck between sliding surfaces of the cylindrical member and the slider, there is possibility that a reciprocating motion of the slider is restricted. For example, a magnetic foreign particle, such as iron, is easily attracted to an attracting portion of the stator which attracts the slider in a one direction of the reciprocating motion thereof. When the foreign particles attracted to the attracting portion are gathered to the inner circumferential surface of the cylindrical member, the foreign particles are stuck between sliding surfaces of the cylindrical member and the slider whereby the reciprocating motion of the sliding core may be restricted.

SUMMARY OF THE INVENTION

The present invention is made in view of the foregoing matter and it is an object of the present invention to provide an electromagnetic driving apparatus and an electromagnetic valve, each of which has a slider smoothly slidablly reciprocating. According to the present invention, a cylindrical member covering an outer surface of a slider includes a small diameter portion slidablly supporting the slider, and a large diameter portion having a larger diameter than that of the small diameter portion, the large diameter portion being continuously formed with the small diameter portion at one end side of the reciprocating direction thereof. At least one portion of an attracting portion is formed at an outer surface side of the large diameter portion. The attracting portion attracts the slider in one direction of the reciprocating motion thereof. A boundary portion between the small diameter portion and the large diameter portion is located at a position where is an opposite side of the attracting portion relative to an attracting end surface of the slider in case that no electric current is supplied to a coil. A clearance larger than a sliding clearance is formed between the outer circumferential surface of the slider and an inner circumferential surface of large diameter portion. Thus, it is restricted that magnetic foreign particles attracted to an attracting portion of the stator and gathered to the inner surface of the large diameter portion, and/or non-magnetic foreign particles gathered to the inner surface of the large diameter portion are stuck between the large diameter portion and a slider. Furthermore, since a step is formed at the boundary portion between the large diameter portion and the small diameter portion due to a difference of inner diameters thereof, the foreign particles gathered to the inner circumferential surface are interrupted. As the result, the foreign particles are prevented from being stuck at the sliding portion of the small diameter portion and the slider. Thus, the slider smoothly slides being supported by the cylindrical member.

DETAILED DESCRIPTION OF EMBODIMENT

An embodiment of the present invention will be described hereinafter with reference to the drawings.

Figure 2:
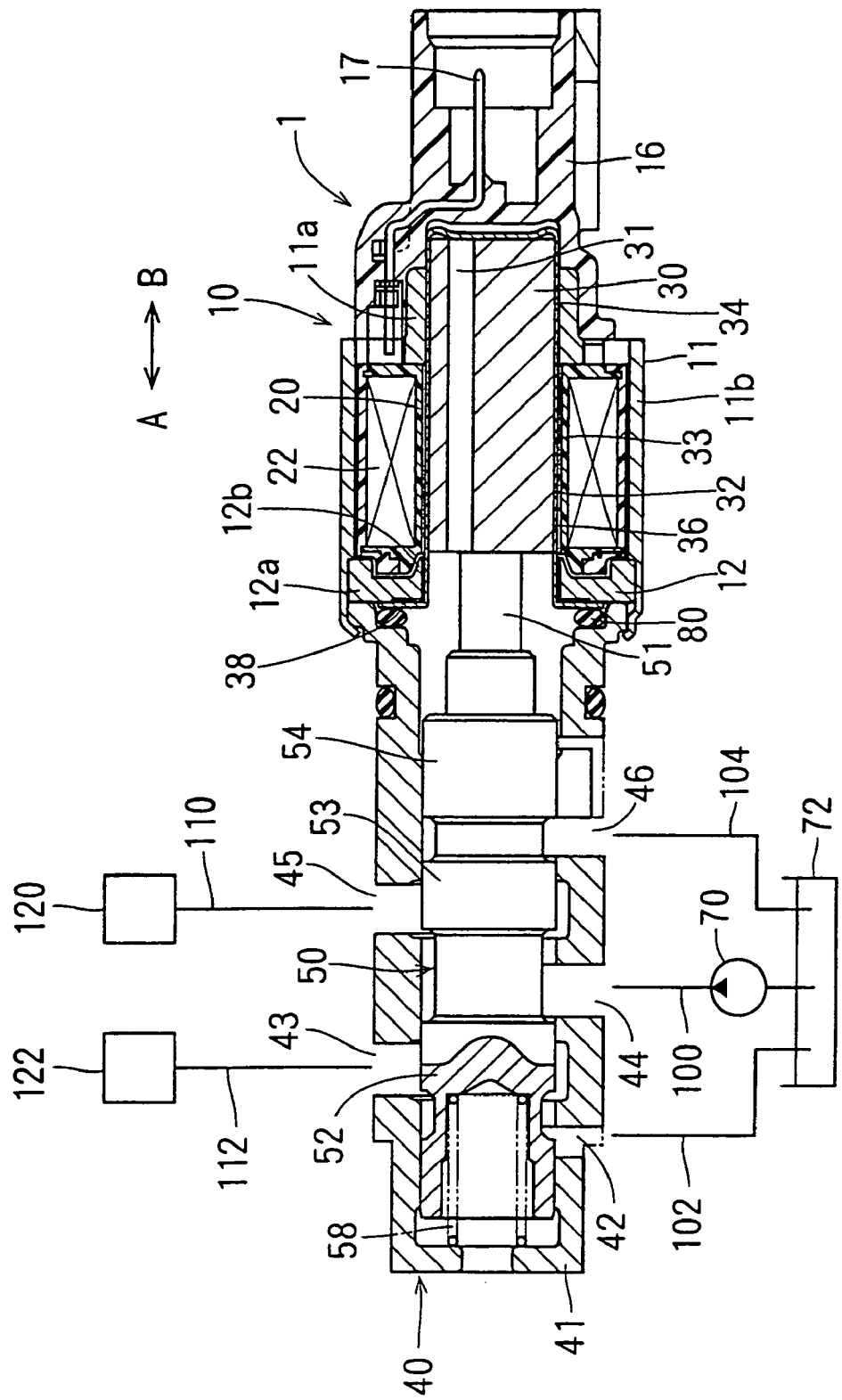
FIG. 2 is a cross-sectional view showing the electromagnetic valve according to the embodiment.

FIG. 2 shows an embodiment of an electromagnetic valve according to the present invention, which is applied to an oil-pressure control valve used for a valve-timing controller of an internal combustion engine. The oil-pressure control valve 1 is mounted on a mounting member (not shown) of the internal combustion engine. FIG. 2 shows the electromagnetic driving apparatus which is receiving no electric current. Arrows "A" and "B" represent a direction of reciprocating motion of a sliding core 30.

The oil-pressure control valve 1 comprises the electromagnetic driving apparatus 10 and a spool control valve 40. The electromagnetic driving apparatus 10 generates a magnetic attracting force which attracts the sliding core 30 by supplying an electric current. A spool 50 as a valve of the spool control valve 40 reciprocates so that an oil amount supplied to both retard angle chamber 120 and an advance angle chamber 122, and an oil amount discharged from the retard angle chamber 120 and the advance angle chamber 122 are adjusted. A yoke 11 of the electromagnetic driving apparatus 10 is caulked on a sleeve 41 at an end portion of outer cylindrical portion 11b, the sleeve 41 being as a housing of the spool control valve 40.

The electromagnetic driving apparatus 10 comprises the yoke 11, a stator core 12, a bobbin 20, a coil 22 wound on the bobbin 20, a sliding core 30, and a cylindrical member 32. The stator comprises the yoke 11 and the coil 22. The yoke 11 covers both an outer circumferential surface of the coil 22 and an opposite side portion of the sliding core 30 relative to the spool 50. A flange portion 12a is held between the yoke 11 and the sleeve 41. The yoke 11, a stator core 12 and a sliding core 30 are made of magnetic materials and form a magnetic circuit.

The yoke 11 has an inner cylindrical portion 11a and an outer cylindrical portion 11b. The inner cylindrical portion 11a covers an opposite side of the siding core 30 relative to the spool 50 in order to confront to the sliding core 30 at the outer surface thereof. The outer cylindrical portion 11b is magnetically connected with the stator core 12 over the coil 22.

Figure 1:
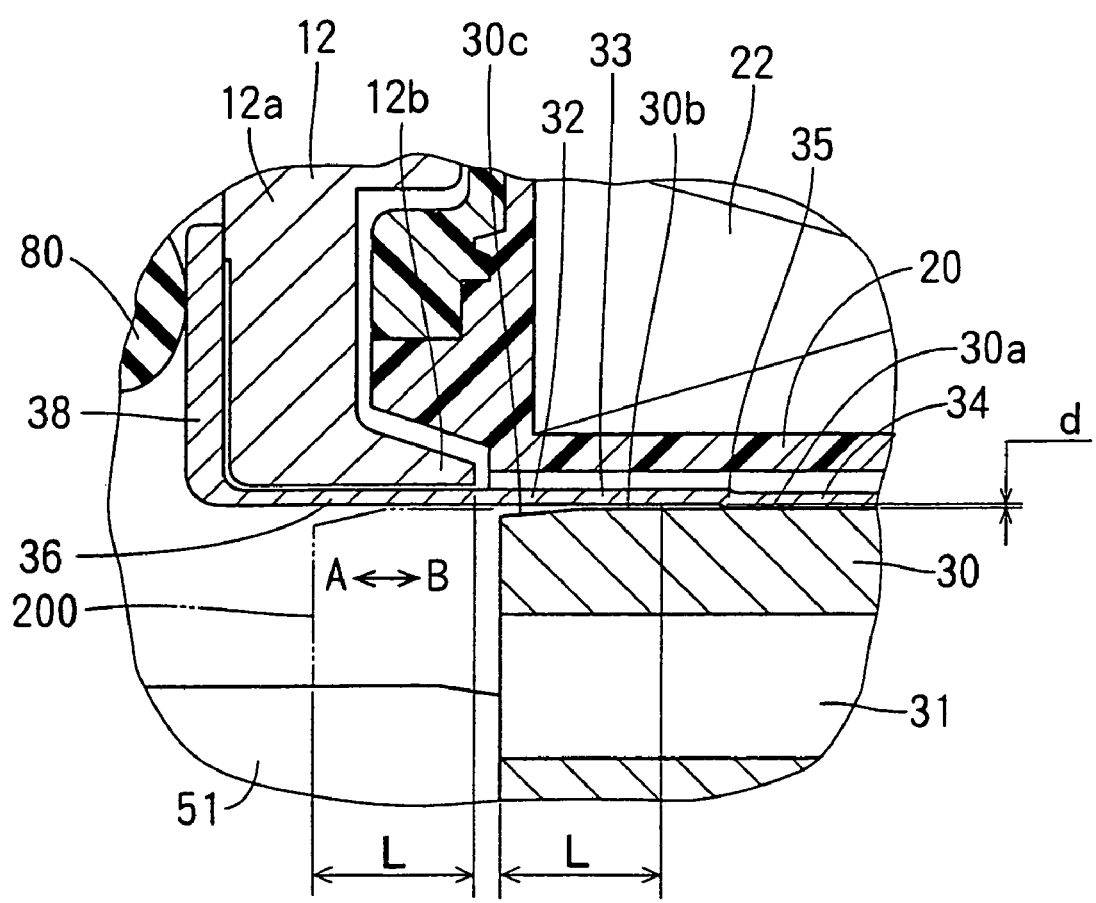
FIG. 1 is an enlarged cross-sectional view showing a vicinity of an attracting portion of an electromagnetic valve according to an embodiment of the present invention.

The stator core 12 has the flange portion 12a and an attracting portion 12b, and is disposed at outer circumferential surface of a large diameter portion 36 of the cylindrical member 32. As shown in FIG. 1, the attracting portion 12b extends from the inner periphery of the flange portion 12a toward to the sliding core 30 along the outer surface of the cylindrical member 32 in an axial direction of the sliding core 30. A thickness of the attracting portion 12b is decreased toward the sliding core 30 in the axial direction represented by the arrow "B" in FIG. 1. When the coil 22 is energized, a magnetic attracting force is generated between the attracting portion 12b and the sliding core 30 to attract the sliding core 30 in one direction of reciprocating motion of the sliding core 30 represented by the arrow "A" in FIG. 1.

As shown in FIG. 2, the coil 22 is connected to a terminal 17 of a connector 16, through which an electric current is supplied to the coil 22. When the driving electric current is supplied to the coil 22, the sliding core 30 is attracted toward the attracting portion 12b of the stator core 12 against a biasing force of the spring 58 contacting with the spool 50. The biasing force of the spring 58 is active in the other direction of the reciprocating motion of the sliding core 30 represented by the arrow "B" in FIG. 1. When an electric current is supplied to the coil 22, a magnetic attracting force attracting the sliding core 30 toward the attracting portion 12b is active in one direction of the reciprocating motion of the sliding core 30 represented by the arrow "A" in FIG. 2.

As shown in FIG. 1, the sliding core 30 has a sliding portion includes a sliding portion 30a, a non-sliding portion 30b, and a tapered portion in this series in one direction of the reciprocating motion thereof toward the spool 50. The sliding core 30 has a coated outer surface in order to reduce a friction relative to the cylindrical member 32. The sliding core 30 has a purge passage 31 communicating both ends of the sliding core 30 at a center portion thereof. Thereby, the reciprocating motion of the sliding core 30 is not restricted.

The sliding portion 30a slidablly moves contacting with the small diameter portion 34 of the cylindrical member 32. The non-sliding portion 30a has the same outer diameter as the sliding portion 30a, and has no contact with the small diameter portion 34.

As shown in FIG. 2, the cylindrical member 32 made from non-magnetic material, such as stainless steel, has a bottomed cylindrical portion 33 and a flange portion 38 to be cup-shaped. The bottomed cylindrical portion 33 is located inside of the inner cylindrical portion 11a, the stator core 12, and the coil 22. The bottom of the bottomed cylindrical portion 33 covers one end of the sliding core 30 opposite to the spool 50. An O-ring fluidly seals between the flange portion 38 of the cylindrical member 32 and the sleeve 41.

As shown in FIG. 1, the bottomed cylindrical portion 33 includes the small diameter portion 34 and the large diameter portion 36 continuously formed with the small diameter portion 34 at the side of attracting portion 12b and having a larger inner diameter than that of the small diameter portion 34. A step 35 is formed at a boundary between the small diameter portion 34 and the large diameter portion 36. The small diameter portion 34 is in slidablly contact with the sliding core 30 and reciprocatably supports the sliding core 30. A radius difference "d" between the small diameter portion 34 and the large diameter portion 36 is equal to or larger than 30 µm.

When the coil 22 is energized to maximumly attract the sliding core 30, the overlap length between the stator core 12 and sliding core 30 is defined as "L". The step 35 is positioned apart from the end surface of the sliding core 30 confronting the attracting portion 12b by a predetermined distance which is longer than "L" when the coil 22 is not energized. In FIG. 1, a chain double-dashed line 200 represents the position of the sliding core 30 when the sliding core 30 is maximumly displaced.

As shown in FIG. 2, the spool control valve 40 has a sleeve 41 and a spool 50. The sleeve 41 has an opening end at the side of the electromagnetic driving apparatus in order that the spool 50 receives a driving force from the sliding core 30. A plurality of openings 42, 43, 44, 45, 46 as fluid passages are formed at predetermined positions of the sleeve 41. A pump 70 supplies an operating oil pumped up from an oil tank 72 to the opening 44 through an oil-supplying passage 100. The openings 42, 46 are fluidly communicated with the oil tank 72 through oil passages 102, 104 respectively. The opening 43 is fluidly communicated with the advance angle chamber 122 through an oil-passage 112.

The spool 50 is slidablly supported by the sleeve 41 in the axial direction thereof. The spool 50 comprises a shaft 51, large diameter portions 52, 53, 54 having substantially the same outer diameter as the inner diameter of the sleeve 41, and small diameter portions connecting the large diameter portions.

One end of the spring 58 is contact with the spool 50 at an opposite end relative to the sliding core 30, and the other end of the spring 58 is contact with a bottom inner surface of the sleeve 41. The spring 58 urges the spool 50 in a direction represented by the arrow "B" in FIG. 1, whereby the shaft 51 is brought into abutment with the sliding core 30.

Next, the operation of the oil control valve 1 is described.

(1) FIG. 2 shows a state in case that no electric current is supplied so that the magnetic attracting force is not generated and the spool 50 and the sliding core 30 are urged by the spring 58 to the position illustrated in FIG. 2. At this moment, the opening 44 communicates to the opening 45 and the opening 42 communicates to the opening 43. The opening 43 does not communicate to the opening 44 and the opening 45 does not communicate to the opening 46. Thereby, the operating oil is supplied from the pump 70 to the retard angle chamber 120 through the openings 44, 45. At the same time, the opening 42 communicates to the opening 43, so that the operating oil in the advance angle chamber 122 is discharged into the oil tank 72.

(2) When the electric current is supplied to the coil 22, the sliding core 30 is attracted to the attracting portion 12b against the biasing force of the spring 58 in a direction represented by the arrow "A" in FIG. 2. The spool 50 slides in a direction represented by the arrow "A" with the sliding core 30 to be in contact with the bottom inner surface of the sleeve 41. Then, the opening 44 communicates to the opening 43 and the opening 46 communicates to the opening 45, and the opening 44 does not communicate to the opening 45 and the opening 42 does no communicated to the opening 43, so that the operating oil is supplied from the pump 70 to the advance chamber 122 through the openings 44, 43. At the same time, the opening 46 communicates to the opening 45, so that the operating oil in the retard angle chamber 120 is discharged into the oil tank 72.

Since the electric current value supplied to the coil 22 is in proportion to the generated magnetic force, the position of the spool can be linearly controlled by controlling the electric current value supplied to the coil 22. Therefore, the amount of the operating oil supplied to or discharged from the retard angle chamber 120 and the advance angle camber 122 can be adjusted according to the position to the spool 50.

In the present embodiment, while the spool control valve 40 is adjusting the amount of the operating oil, the operating oil may flow from the spool control valve 40 to the sliding core 30 of the electromagnetic driving apparatus 10. Even if a foreign particle is contained in the operating oil, the foreign particle is blocked by the step 35 formed at the boundary between the small diameter portion 34 and the large diameter portion 36 and is gathered to the inner circumferential surface of the large diameter portion 36. Especially, foreign particles made of magnetic material attracted to the attracting portion 12b gather to the inner cylindrical surface of the large diameter 36 confronting to the attracting portion 12b. Since the radius difference between the small diameter portion 34 and the large diameter portion 36 is equal to or larger than 30 μm, a clearance larger than a sliding clearance is formed between the outer circumferential surface of the sliding core 30 and the inner circumferential surface of large diameter portion 36. The step 35 is positioned apart from the end surface of the sliding core 30 confronting the attracting portion 12b by a predetermined distance which is longer than "L" when the coil 22 is not energized. The foreign particles adhering on the sliding core 30 overlapping the stator core 12 in case of a full stroke of the sliding core 30 remain at inner surface of the cylindrical member 32 at the side of the large diameter portion 36 relative to the step 35 even if the coil 22 is deenergized to move the sliding core 30 to the opposite side of the attracting portion. Therefore, it is prevented that the foreign particles is introduced between the small diameter portion 34 of the cylindrical member 32 and the sliding core 30.

Furthermore, without respect to whether the foreign particles are made of magnetic material or non-magnetic material, the step 35 formed between the large diameter portion 36 and the small diameter portion 34 blocks the foreign particles being introduced from the large diameter portion 36 to the small diameter portion 34. Therefore, the foreign particles can be prevented from being stuck in sliding portion of outer surfaces of the sliding core 30 and the small diameter portion 34. Thus, the sliding core 30 can smoothly reciprocate supported by the cylindrical member 32.

In the present embodiment, the bottom portion of the cylindrical member 32 made of non-magnetic material covers the opposite side of sliding core 30 relative to the spool 50, and it is sealed between the flange portion 38 of the cylindrical member 32 and the sleeve 41 by the O-ring 80. Thus, it is prevented that the operating oil, which has flowed from the spool 50 to the sliding core 30, flows into the outer surface of the cylindrical member 32, for instance, the coil 22.

(Another Embodiment)

In the present invention, the radius difference between the small diameter portion and the large diameter portion of the cylindrical member is not always equal to or larger than 30 μm. If it is possible to prevent the foreign particles from being stuck between the large diameter portion and the small diameter portion of the cylindrical member, the radius difference can be less than 30 μm. The attracting portion of the stator can be formed at the opposite side of the sliding core 30 relative to the spool 50.

In the previous embodiment, a spool as a valve body can be kept at a middle position by controlling the electric current supplied to the coil which comprises the electromagnetic driving apparatus, whereby the oil-pressure control valve can control the amount of operating fluid flowing through the fluid passages. Other than this structure, the electromagnetic valve can be positioned in two positions in which the fluid passages are fully opened or fully closed. Alternatively, the electromagnetic driving apparatus can be used other than the apparatus which controls the amount of the fluid, in which a slider can smoothly reciprocate.

What is claimed is:

1. An electromagnetic driving apparatus comprising:
   a slider;
   a cylindrical member made of non-magnetic material, the cylindrical member covering an outer surface of the slider to reciprocatably support the slider;
   a stator generating a magnetic circuit in cooperation with the slider, the stator including an attracting portion which attracts the slider in one direction of the reciprocating motion of the slider; and
   a coil disposed outside of the cylindrical member, the coil generating a magnetic attracting force between the slider and the attracting portion when energized; wherein
   the cylindrical member has a small diameter portion reciprocatably supporting the slider, and a large diameter portion having a larger diameter than that of the small diameter portion, the large diameter portion continuously formed with the small diameter portion at one side of a reciprocating direction,
   at least one part of the attracting portion is disposed on an outer side of the large diameter portion so that an inner surface of the attracting portion faces an outer surface of the large diameter portion, and
   a boundary portion between the small diameter portion and the large diameter portion is located at a position that is on an opposite side of an attracting end surface of the slider with respect to the attracting portion when no electric current is supplied to the coil.

2. The electromagnetic driving apparatus according to claim 1, wherein the radius difference between the large diameter portion and the small diameter portion is equal to or larger than 30 μm.

3. The electromagnetic driving apparatus according to claim 1, wherein
   the position of the boundary portion is spaced from the attracting end surface of the slider by a distance which is longer than an overlap length between the stator core and slider when the coil is energized to maximally attract the slider.

4. A electromagnetic valve comprising:
   an electromagnetic driving apparatus according to claim 1;
   a valve member reciprocating with the slider and controlling an amount of an operating fluid flowing through a fluid passage;
   a housing accommodating the valve member reciprocatably; and
   a biasing means for biasing the slider in the other direction of the reciprocating motion of the slider.

5. The electromagnetic valve according to claim 4, wherein
   the attracting portion is disposed at a side of the valve member relative to the slider.

6. The electromagnetic valve according to claim 5, further comprising
   a sealing member for sealing between the cylindrical member and the housing, wherein
   the cylindrical member is in a shape of a bottomed cylinder covering an opposite end of the slider relative to the valve member.

7. The electromagnetic driving apparatus according to claim 2, wherein
the position of the boundary portion being apart from the attracting end surface of the slider by a distance which is longer than an overlap length between the stator core and sliding core when the coil is energized to maximally attract the sliding core.

8. An electromagnetic driving apparatus comprising:
a slider;
a cylindrical member made of non-magnetic material, the cylindrical member covering an outer surface of the slider to reciprocatably support the slider;
a stator generating a magnetic circuit in cooperation with the slider, the stator including an attracting portion which attracts the slider in one direction of the reciprocating motion of the slider; and
a coil disposed outside of the cylindrical member, the coil generating a magnetic attracting force between the slider and the attracting portion when energized; wherein
the cylindrical member has a small diameter portion reciprocatably supporting the slider, and a large diameter portion having a larger diameter than that of the small diameter portion, the large diameter portion continuously formed with the small diameter portion at one side of a reciprocating direction, and
at least one part of the attracting portion is disposed on an outer side of the large diameter portion so that an inner surface of the attracting portion faces an outer surface of the large diameter portion.

9. The electromagnetic driving apparatus according to claim 8, wherein a boundary portion between the small diameter portion and the large diameter portion is spaced from an end surface of the slider confronting the attracting portion by a distance which is longer than an overlap length between the stator core and the slider when the coil is energized to maximally attract the slider.

* * * * *